United States Patent [19]
Schote

[11] Patent Number: 5,924,711
[45] Date of Patent: Jul. 20, 1999

[54] WHEEL SUSPENSION FOR A MOTOR VEHICLE

[75] Inventor: Norbert Schote, Ammerbuch, Germany

[73] Assignee: Dr. Ing. h.c.F. Porsche AG, Weissach, Germany

[21] Appl. No.: 08/870,839

[22] Filed: Jun. 6, 1997

[30] Foreign Application Priority Data

Jun. 7, 1996 [DE] Germany .............................. 196 22 954

[51] Int. Cl.⁶ ...................................................... B06G 9/02
[52] U.S. Cl. .............................. 280/124.111; 280/124.128
[58] Field of Search ....................... 280/124.111, 124.128

[56] References Cited

U.S. PATENT DOCUMENTS

| | | | |
|---|---|---|---|
| 3,414,290 | 12/1968 | Wilfert et al. | 280/124.111 |
| 3,448,992 | 6/1969 | Wilfert et al. | 280/124.111 |
| 3,473,821 | 10/1969 | Barenyi et al. | 280/124.111 |
| 3,610,655 | 10/1971 | Barenyi et al. | 280/124.111 |
| 4,767,133 | 8/1988 | Yamada | 280/124.111 |

FOREIGN PATENT DOCUMENTS

| | | |
|---|---|---|
| 0324663A1 | 7/1989 | European Pat. Off. . |
| 3842339A1 | 6/1990 | Germany . |
| 4419221C1 | 7/1995 | Germany . |
| 4422875A1 | 1/1996 | Germany . |

OTHER PUBLICATIONS

*Fahrwerktechnik* 1, Prof. Dip.–Ing. Jörnsen Reimpell, 1982. Section 3.2.3, Führung er Achse durch Lenkerpaare, pp. 324–326.
Office Action, Nov. 14, 1996, Germany.
Search Report, Oct. 10, 1997, Europe.

*Primary Examiner*—Kenneth R. Rice
*Attorney, Agent, or Firm*—Evenson, McKeown, Edwards & Lenahan, PLLC

[57] ABSTRACT

A wheel suspension for a motor vehicle is constructed with an axle bracing body which comprises an axle tube extending transversely to the driving direction and adjoining, longitudinally extending, additional axle tubes. On both ends of these axle tubes, one wheel respectively is disposed which is supported toward the vehicle body by way of a spring-and-damper element. The transversely extending axle tube is held by way of a center bearing in a cardanically disposed manner on the vehicle body and, in the area of the center bearing, has at least one softly bending zone. The free ends of the longitudinally extending axle tube are swivellably connected with transverse struts and are supported on the vehicle body in bearings.

20 Claims, 3 Drawing Sheets

WHEEL SUSPENSION FOR A MOTOR VEHICLE

BACKGROUND AND SUMMARY OF THE INVENTION

This application claims the priority of German application 196 22 954.5 filed in Germany on Jun. 7, 1996, the disclosure of which is expressly incorporated by reference herein.

The invention relates to a wheel suspension for a motor vehicle having an axle bracing body which comprises a transversely extending axle tube extending transversely to the driving direction and adjoining, longitudinally extending, additional axle tubes on whose two ends one wheel respectively is disposed and which are supported toward the vehicle body by way of a spring-and-damper element, the transversely extending axle tube being held by way of a center bearing in a cardanically disposed manner on the vehicle body.

From German Patent Document DE 44 19 221 C1, a wheel suspension of a rear axle is known which has an axle bracing body with a central bearing as well as a Watt linkage. Furthermore, from German Patent Document DE 44 22 875 A1, a suspension of a rear axle for a motor vehicle is known which has a stiff axle bracing body which has an axle tube which extends transversely with respect to the driving direction and has wheels disposed on the end side. By way of an elastic bearing arranged in the center, the axle tube is cardanically linked to the vehicle body. The free ends of the axle tube are equipped with an end piece on which the wheels are disposed and are connected with one another by way of A-arms which, by way of a bearing, are held on a bending-resistant control arm which is supported on the vehicle body.

It is an object of the invention to provide a wheel suspension for a rear axle of a motor vehicle which has a simple construction and permits targeted wheel position changes in the case of forces acting upon the wheel as well as in the case of compression and rebounding operations.

According to preferred embodiments of the invention, this object is achieved by providing an arrangement wherein the transversely extending axle tube 3 has at least one softly bending zone in an area of the center bearing, and wherein free ends of the longitudinally extending axle tubes are swivellably connected with transverse struts which are supported on the vehicle body in bearings.

Principal advantages achieved by means of the invention are the fact that the wheel suspension is formed of a U-shaped axle tube which has a center bearing and is connected with the free ends of longitudinally extending axle tubes in each case by means of transverse struts which are linked to the body side in a swivellable manner. These transverse struts cause a supporting of the wheels in the event that forces act upon the wheel.

The transversely extending axle tube of the wheel suspension has a soft zone around the center bearing so that a bending of the axle tube can take place in this zone during suspension operations. This bending movement is required because of the transverse struts which cause a forced guiding of the longitudinally extending axle tubes on a circular path.

This bending movement of the transversely extending axle tube in the case of suspension operations causes a lateral-force understeering and, because of the corresponding arrangement of the bearing points of the transverse struts in the area of the longitudinal center axis of the vehicle on the vehicle body as well as of the ends of the struts facing away on the longitudinally extending axle tubes, the toe-in changes can be varied.

The soft zone in the transversely extending axle tube can, for example, be formed by an interposed, elevated spring leaf or by compressed tube sections. However, embodiments are also contemplated with the axle tube dimensioned such that a bending can occur.

Depending on the type of construction and available space, the transverse struts can consist of struts which extend transversely from a longitudinally extending axle tube to an exterior side member of the vehicle body, or of struts which are disposed approximately in the longitudinal center axis of the vehicle on a member which is connected with the vehicle body.

The center bearing is constructed as a cardanic elastic bearing so that the wheel suspension consisting of the U-shaped axle tube can move mainly about a vertical axis as well as about a transverse axis.

For varying the toe-in changes, for example, in the case of suspension operations in the opposite direction (rolling), particularly when the right wheel rebounds and the left wheel compresses, the bearings of the transverse struts are correspondingly arranged below or above a horizontal plane extending through the center bearing.

In the case of a same-side suspension of the wheels (both rebound or compress), the position of the two transverse struts, viewed from the rear is sloped toward the interior top, whereby a positive toe-in change occurs, or they are sloped toward the interior bottom, whereby a negative toe-in change occurs.

Other objects, advantages and novel features of the present invention will become apparent from the following detailed description of the invention when considered in conjunction with the accompanying drawings.

DETAILED DESCRIPTION OF THE DRAWINGS

Figure 1:
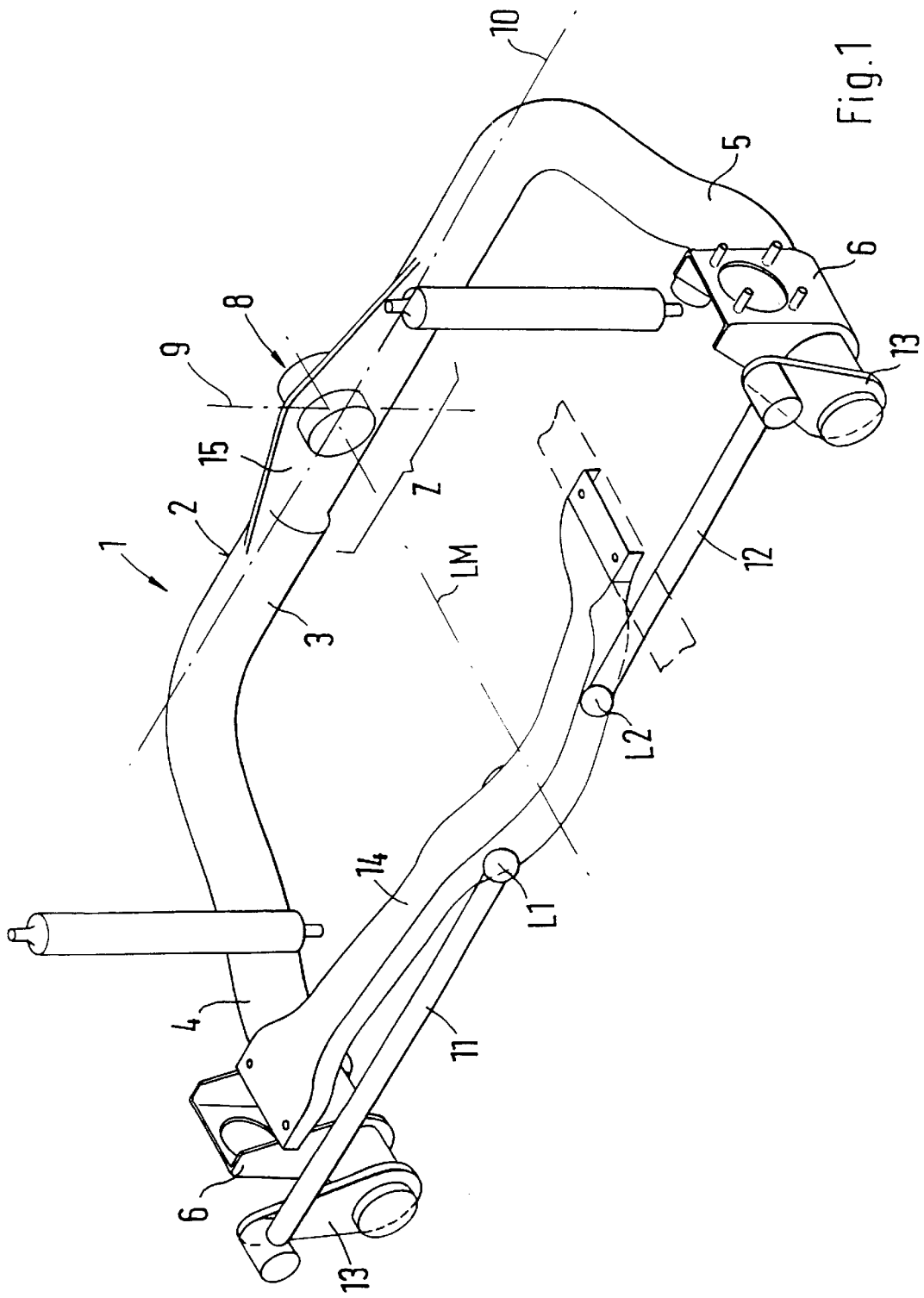
FIG. 1 is a diagrammatic representation of a rear axle with a soft zone constructed as a leaf spring and two short transverse struts, constructed according to a preferred embodiment of the present invention.

The wheel suspension 1 comprises essentially a tube 2 which is bent in a U-shape and has an approximately transversely extending axle tube 3 which is adjoined by two longitudinally extending axle tubes 4 and 5. On these axle tubes 4 and 5, wheel supports 6 for receiving wheels 7 are disposed in each case.

The axle tube 2 of the suspension 1 is supported on the vehicle body by way of an elastic center bearing 8. This bearing 8 permits elastic movements about a vertical axis 9 and about a horizontal transverse axis 10 and corresponding suspension movements of the vehicle.

This transverse axis 10 is used as an axis of rotation in the case of a same-sided compressing. The additional axis of rotation is situated in the longitudinal center axis LM of the vehicle and acts in the case of a mutual compressing (rolling).

On the free ends of the longitudinally extending axle tubes 4, 5, short transverse struts 11, 12 are in each case swivellably held with one of their ends by way of bearings in a bearing block 13 or the like, and by means of their other free end, which faces away, the transverse struts 11, 12 are swivellably supported on the vehicle body in bearings L1, L2. This support toward the vehicle body can also take place by means of a cross member 14 which is connected with the vehicle body, as illustrated in detail in FIG. 1.

In the area of the center bearing 8, the transversely extending axle tube 3 of the suspension 1 has a softly bending zone Z so that, during compression operations, a contraction of the longitudinally extending axle tubes 4, 5 forced by the transverse struts 11, 12 can take place and thus a bending of the transversely extending axle tube in the area of the softly bending zone.

Depending on the desired toe-in adjustment, the bearings L1 and L2 of the transverse struts 11, 12 on the cross member 14 may be situated higher or lower with respect to a horizontal plane extending through the center bearing.

Figure 2:
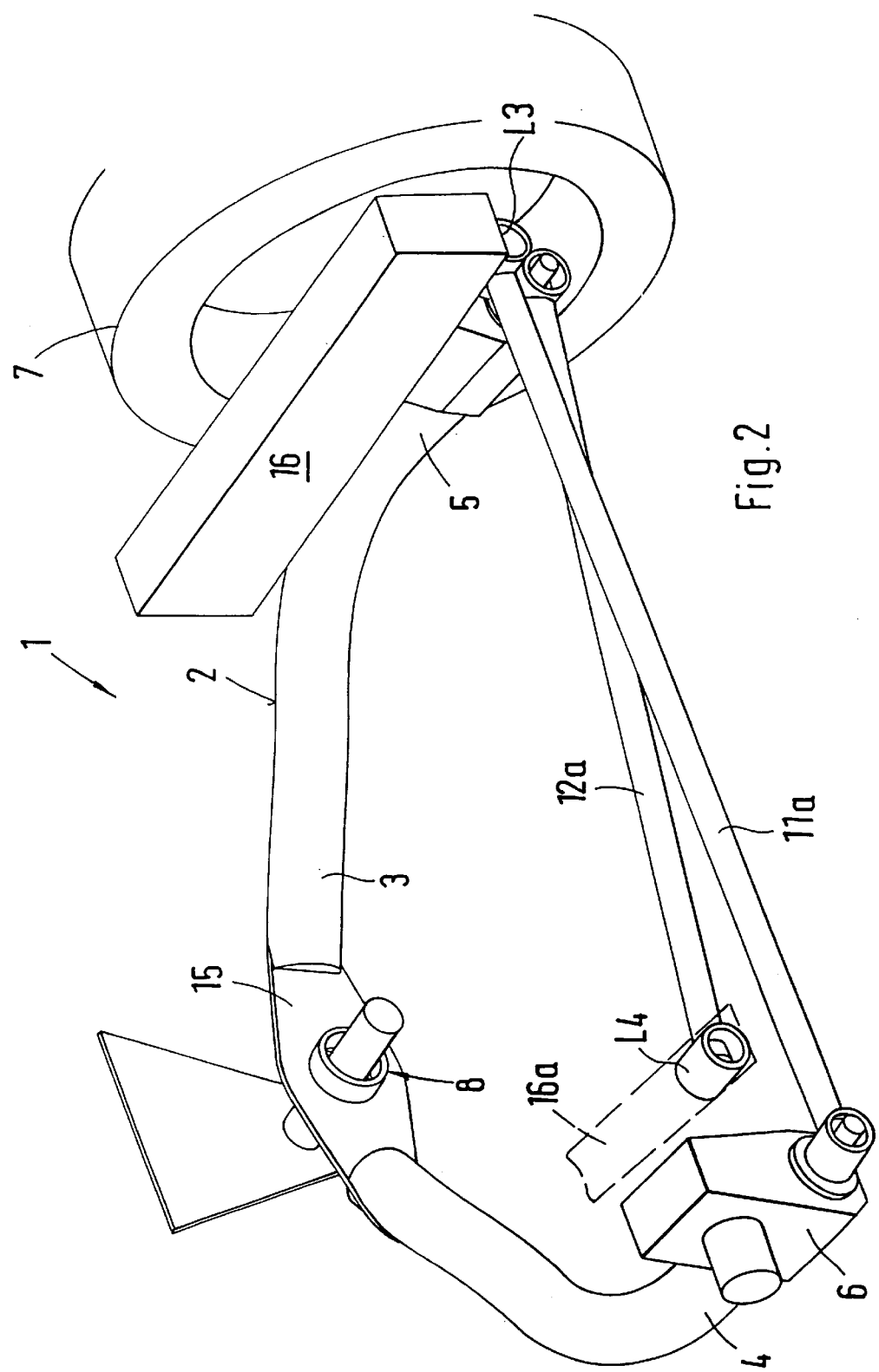
FIG. 2 is a view of another embodiment of a rear axle with two long transverse struts.

According to another embodiment according to FIG. 2, the transverse struts 11a, 12a can also extend from one wheel side to the opposite wheel side. They will then in each case be disposed on the opposite side member 16 of the vehicle body at reference numbers L3 and L4, The relatively long length of the transverse struts 11a, 12a in comparison to the shorter transverse struts 11, 12 of the other embodiment causes only a slight contraction of the axle tube 3 in the softly bending zone Z.

Figure 3:
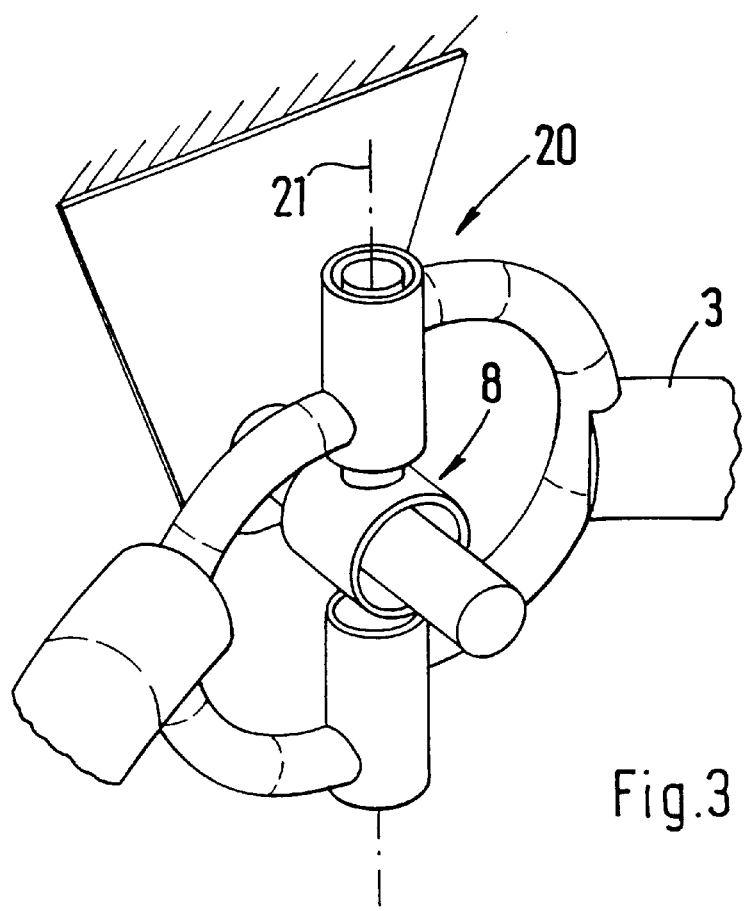
FIG. 3 is a schematic representation of a center bearing in the axle tube constructed according to preferred embodiments of the invention.
Figure 4:
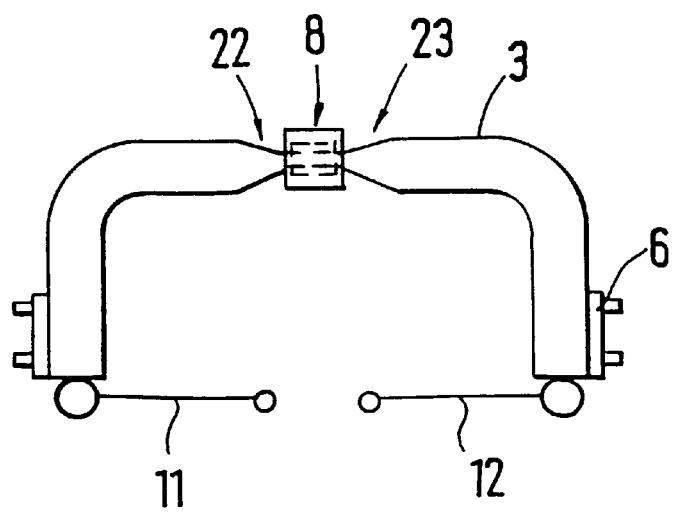
FIG. 4 is a view of another embodiment of the axle tube with a soft zone of compressed tube sections.

The softly bending zone Z is formed by an upright leaf spring 15 which has the bearing 8 in the center and on the end sides is in each case connected with the axle tube 3. According to another embodiment according to FIG. 3, the softly bending zone z can also be formed by a bearing 20 which has a vertical axis 21. The center bearing 8 is integrated into this softly bending zone Z. Furthermore, the softly bending zone Z may also be constructed as depressed tube sections 22, 23 on both sides of the center bearing a (FIG. 4). However, an axle tube is also conceivable which is dimensioned such that a softly bending zone Z is formed because of the tube diameter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wheel suspension for a motor vehicle having an axle bracing body which comprises a transversely extending axle tube extending transversely to the driving direction and adjoining, longitudinally extending, additional axle tubes on whose two ends one wheel respectively is disposed and which are supported toward the vehicle body by way of a spring-and-damper element, the transversely extending axle tube being held by way of a center bearing in a cardanically disposed manner on the vehicle body, wherein the transversely extending axle tube has at least one softly bending zone in an area of the center bearing, and wherein free ends of the longitudinally extending axle tubes are swivellably connected with transverse struts which are supported on the vehicle body in bearings.

2. Wheel suspension according to claim 1, wherein the transverse struts are swivellably supported in bearings on a support which is held on the vehicle body side.

3. Wheel suspension according to claim 1, wherein the bearings are arranged directly adjacent to both sides of a longitudinal center axis of the vehicle.

4. Wheel suspension according to claim 2, wherein the bearings are arranged directly adjacent to both sides of a longitudinal center axis of the vehicle.

5. Wheel suspension according to claim 1, wherein the transverse struts extend from the free ends of the longitudinally extending axle tubes to one exterior side member of the vehicle body respectively.

6. Wheel suspension according to claim 2, wherein the transverse struts extend from the free ends of the longitudinally extending axle tubes to one exterior side member of the vehicle body respectively.

7. Wheel suspension according to claim 1, wherein the softly bending zone is formed by a leaf spring which receives the center bearing between it and is connected with the transversely extending axle tube.

8. Wheel suspension according to claim 1, wherein the softly bending zone is formed by depressed tube sections of the transversely extending axle tube.

9. Wheel suspension according to claim 1, wherein the center bearing in the axle tube has a pronounced elasticity about a vertical swivel axis as well as about a horizontal swivel axis.

10. Wheel suspension according to claim 2, wherein the center bearing in the axle tube has a pronounced elasticity about a vertical swivel axis as well as about a horizontal swivel axis.

11. Wheel suspension according to claim 3, wherein the center bearing in the axle tube has a pronounced elasticity about a vertical swivel axis as well as about a horizontal swivel axis.

12. Wheel suspension according to claim 4, wherein the center bearing in the axle tube has a pronounced elasticity about a vertical swivel axis as well as about a horizontal swivel axis.

13. Wheel suspension according to claim 5, wherein the center bearing in the axle tube has a pronounced elasticity about a vertical swivel axis as well as about a horizontal swivel axis.

14. Wheel suspension according to claim 1, wherein the free ends of the transverse struts have a bearing point on one of a cross member fixed to the vehicle body and a vehicle body side member, and wherein the bearing points are arranged below or above a horizontal plane extending through a bearing plane.

15. Wheel suspension assembly for supporting a pair of laterally spaced wheel on a vehicle body comprising:
- a pair of longitudinally extending axle members connected by a transversely extending axle member to form a U-shaped axle bracing body,
- respective free ends of said longitudinally extending axle members being configured to support a vehicle wheel,
- a center bearing cardanically supporting the transversely extending axle member at the vehicle body,
- wherein the transversely extending axle tube has at least one elastic bending zone in an area of the center bearing, and
- wherein free ends of the longitudinally extending axle tubes are swivellably connected with transverse struts which are supported on the vehicle body in bearings.

16. Wheel suspension assembly according to claim 15, wherein the transverse struts are swivellably supported in bearings on a support which is held on the vehicle body side.

17. Wheel suspension assembly according to claim 15, wherein the bearings are arranged directly adjacent to both sides of a longitudinal center axis of the vehicle.

18. Wheel suspension assembly according to claim 15, wherein the transverse struts extend from the free ends of the longitudinally extending axle tubes to one exterior side member of the vehicle body respectively.

19. Wheel suspension assembly according to claim 15, wherein the transverse struts extend from the free ends of the longitudinally extending axle tubes to one exterior side member of the vehicle body respectively.

20. Wheel suspension assembly according to claim 15, wherein the elastic bending zone is formed by depressed tube sections of the transversely extending axle tube.

* * * * *